(12) United States Patent
Saito et al.

(10) Patent No.: US 11,162,574 B2
(45) Date of Patent: Nov. 2, 2021

(54) SPEED REDUCTION MECHANISM AND MOTOR WITH SPEED REDUCER

(71) Applicant: MITSUBA Corporation, Gunma (JP)

(72) Inventors: Tatsuyuki Saito, Gunma (JP); Tetsuya Watanabe, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/646,150

(22) PCT Filed: Aug. 28, 2018

(86) PCT No.: PCT/JP2018/031733
§ 371 (c)(1),
(2) Date: Mar. 11, 2020

(87) PCT Pub. No.: WO2019/077886
PCT Pub. Date: Apr. 25, 2019

(65) Prior Publication Data
US 2020/0217398 A1    Jul. 9, 2020

(30) Foreign Application Priority Data

Oct. 16, 2017  (JP) .............................. JP2017-200266
Oct. 16, 2017  (JP) .............................. JP2017-200267

(51) Int. Cl.
*F16H 1/32*      (2006.01)
*F16H 57/021*    (2012.01)
(Continued)

(52) U.S. Cl.
CPC ....... *F16H 57/0482* (2013.01); *F16H 57/021* (2013.01); *F16H 2001/323* (2013.01); *F16H 2001/327* (2013.01)

(58) Field of Classification Search
CPC ................ F16H 1/32; F16H 2001/323; F16H 2001/327; F16H 2057/02034; F16H 57/021–023; H02K 7/116
See application file for complete search history.

(56) References Cited

U.S. PATENT DOCUMENTS

| 7,889 A | * | 1/1851 | Neff ....................... H02K 25/00 |
| | | | 310/46 |
| 5,820,504 A | * | 10/1998 | Geralde .................. F16H 48/12 |
| | | | 475/177 |
| 2015/0219187 A1 | | 8/2015 | Saito et al. | |

FOREIGN PATENT DOCUMENTS

| CN | 108869643 A | * | 11/2018 | ............... F16H 1/32 |
| JP | 370692 | | 7/1956 | |

(Continued)

OTHER PUBLICATIONS

"Office Action of Japan Counterpart Application", dated Nov. 10, 2020, with English translation thereof, p. 1-p. 8.

(Continued)

*Primary Examiner* — Ernesto A Suarez
*Assistant Examiner* — James J Taylor, II
(74) *Attorney, Agent, or Firm* — JCIPRNET

(57) ABSTRACT

Provided are a speed reduction mechanism and a motor with a speed reducer, which are highly efficient and compact. The present invention is provided with: an eccentric shaft rotated about a motor axis by the rotational force of a motor section and having an outer peripheral surface having a center at a position eccentric to the motor axis; a rocking gear rotatably supported by the outer peripheral surface through a ball bearing and having inner teeth and outer teeth; a ring gear having inner teeth which mesh with the outer teeth of the rocking gear and which are concentric with the motor axis;

(Continued)

and an output section having outer teeth which mesh with the inner teeth of the rocking gear and which are concentric with the motor axis.

5 Claims, 3 Drawing Sheets

(51) Int. Cl.
*F16H 57/04* (2010.01)
*H02K 7/116* (2006.01)
*F16H 57/02* (2012.01)

(56) References Cited

FOREIGN PATENT DOCUMENTS

| | | | |
|---|---|---|---|
| JP | 4212453 | 7/1967 | |
| JP | 2014081068 | 5/2014 | |
| WO | WO-2016072453 A1 * | 5/2016 | ............. H02K 7/116 |

OTHER PUBLICATIONS

"International Search Report (Form PCT/ISA/210) of PCT/JP2018/031733," dated Oct. 30, 2018, with English translation thereof, pp. 1-2.
"International Preliminary Report on Patentability (Form PCT/IB/373) of PCT/JP2018/031733," completed on Apr. 21, 2020, with English translation thereof, pp. 1-14.
"Search Report of Europe Counterpart Application", dated Jun. 18, 2021, p. 1-p. 10.

* cited by examiner

SPEED REDUCTION MECHANISM AND MOTOR WITH SPEED REDUCER

CROSS-REFERENCE TO RELATED APPLICATION

This application is a 371 application of an international PCT application serial no. PCT/JP2018/031733, filed on Aug. 28, 2018, which claims the priority benefit of Japan application JP2017-200266, filed on Oct. 16, 2017 and Japan application JP2017-200267, filed on Oct. 16, 2017. The entirety of the above-mentioned patent application is hereby incorporated by reference herein and made a part of this specification.

BACKGROUND

Technical Field

The disclosure relates to a speed reduction mechanism and a motor with a speed reducer.

Description of Related Art

Conventionally, there is known a motor with a speed reducer that obtains a high rotational torque by reducing the speed of the rotation of the motor with a speed reduction mechanism (speed reducer). In speed reduction mechanisms of motors with a speed reducer, some include a fixed gear (a first inner gear) which is in a circular ring shape mounted to a gear casing (housing); an eccentric shaft which is rotated by a rotation input from a motor section (electric motor); a rocking gear (a first outer gear) which is rotatably mounted to an eccentric outer peripheral surface (eccentric shaft section) of the eccentric shaft via a bearing and which has outer teeth that mesh with inner teeth of the fixed gear and has inner teeth in addition to the outer teeth; and an output gear (output member) which is meshed with the inner teeth of the rocking gear and which is rotated by a rotation output whose speed is reduced as compared with the rotation of the eccentric shaft.

Here, for example, in Patent Document 1, two ball bearings are used to rotatably support a rocking gear by an eccentric shaft.

Related Art

Patent Document

[Patent Document 1] Japanese Laid-Open No. 2014-81068

SUMMARY

Technical Problem

In recent years, there has been a demand for a motor with a speed reducer to be more efficient and more compact. However, in a speed reduction mechanism as disclosed in Patent Document 1, depending on the meshing position between the inner teeth of the fixed gear and the outer teeth of the rocking gear and on the meshing position of the inner teeth of the rocking gear and the outer teeth of the output gear, there is a possibility that a load in a tilt direction with respect to the radial direction (hereinafter referred to as a falling load) is applied to the rocking gear, and the speed reduction efficiency of the speed reduction mechanism is reduced.

Further, in order to receive the falling load applied to the rocking gear, it is necessary to use two ball bearings between the eccentric shaft and the rocking gear, and there has been a problem that it is difficult to make the motor with the speed reducer compact.

The disclosure has been made in view of the above circumstances, and provides a speed reduction mechanism and a motor with a speed reducer that are highly efficient and compact.

Solution to the Problem

To solve the above problem, a speed reduction mechanism according to the disclosure includes: an eccentric shaft rotated around a rotation axis by a rotational force of a motor section and having an eccentric outer peripheral surface with a center at an eccentric position eccentric to the rotation axis; a rocking gear rotatably supported by the eccentric outer peripheral surface via a bearing and having first inner teeth and first outer teeth; a fixed gear having second inner teeth which mesh with the first outer teeth of the rocking gear and which are concentric with the rotation axis; and an output gear having second outer teeth which mesh with the first inner teeth of the rocking gear and which are concentric with the rotation axis, wherein at least part of a range of meshing between the first outer teeth of the rocking gear and the second inner teeth of the fixed gear and at least part of a range of meshing between the first inner teeth of the rocking gear and the second outer teeth of the output gear overlap each other in a radial direction orthogonal to the rotation axis.

In this way, at least part of the range of meshing between the first outer teeth of the rocking gear and the second inner teeth of the fixed gear, and at least part of the range of meshing between the first inner teeth of the rocking gear and the second outer teeth of the output gear overlap each other in the radial direction, whereby these ranges of meshing are located substantially on the same plane. As a result, it is possible to suppress the falling load from being applied to the rocking gear, and it is possible to suppress a reduction in the speed reduction efficiency of the speed reduction mechanism. Therefore, the efficiency of the speed reduction mechanism can be increased.

In the speed reduction mechanism according to the disclosure, a center position in a direction of the rotation axis of the range of meshing between the first outer teeth of the rocking gear and the second inner teeth of the fixed gear, a center position in the direction of the rotation axis of the range of meshing between the first inner teeth of the rocking gear and the second outer teeth of the output gear, and a center position in the direction of the rotation axis of the bearing are located on a same plane in the radial direction.

By adopting such a configuration, it is possible to suppress the meshing load of the respective teeth from becoming a falling load on the bearing. Therefore, it is not necessary to provide two bearings as a conventional countermeasure against the falling load applied to the bearings, and one bearing can receive the meshing load of the respective teeth. In addition, the reduction in the number of bearings can reduce the axial-direction thickness of the speed reduction mechanism. As a result, the speed reduction mechanism can be more compact.

In the speed reduction mechanism according to the disclosure, the rocking gear includes: a rocking gear body which is in a circular plate shape extending in the radial direction; a bearing housing which is in a cylindrical shape standing upright from a radial-direction center of the rocking gear body and fitted to the bearing; and a tooth wall which is in a cylindrical shape standing upright from an outer peripheral section of the rocking gear body toward a same direction as an upright direction of the bearing housing, wherein the first inner teeth are formed on an inner peripheral surface of the tooth wall, and the first outer teeth are formed on an outer peripheral surface of the tooth wall.

By adopting such a configuration, with a simple structure, an axial-direction center position of the rotation axis of the range of meshing between the first outer teeth of the rocking gear and the second inner teeth of the fixed gear, an axial-direction center position of the range of meshing between the first inner teeth of the rocking gear and the second outer teeth of the output gear, and an axial-direction center position of the bearing can be made to be located on a same plane in the radial direction. As a result, it is possible to more effectively making the speed reduction mechanism compact.

A motor with a speed reducer according to the disclosure includes: the speed reduction mechanism as described above; and the motor section having a rotation shaft connected to the eccentric shaft and rotating around the rotation axis.

By adopting such a configuration, the motor with the speed reducer that is highly efficient and compact can be provided.

Effects

According to the disclosure, at least part of the range of meshing between the first outer teeth of the rocking gear and the second inner teeth of the fixed gear, and at least part of the range of meshing between the first inner teeth of the rocking gear and the second outer teeth of the output gear overlap each other in the radial direction, whereby these ranges of meshing are located substantially on the same plane. In this way, it is possible to suppress the falling load from being applied to the rocking gear, and it is possible to suppress a reduction in the speed reduction efficiency of the speed reduction mechanism. Therefore, the efficiency of the speed reduction mechanism can be increased.

DESCRIPTION OF THE EMBODIMENTS

Next, embodiments of the disclosure will be described based on the drawings.

Motor with Speed Reducer

Figure 1:
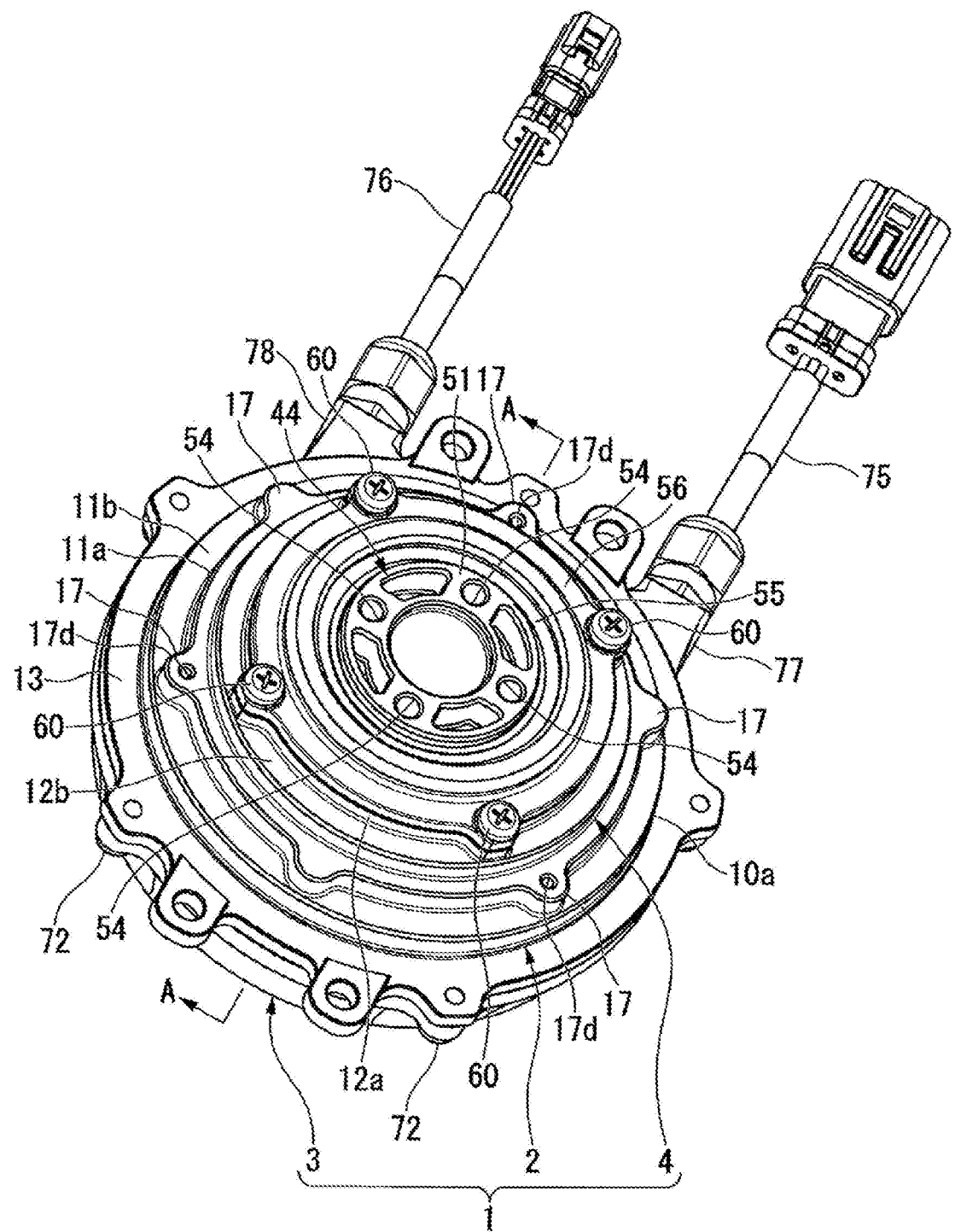
FIG. 1 is a perspective view of a motor with a speed reducer according to an embodiment of the disclosure.
Figure 2:
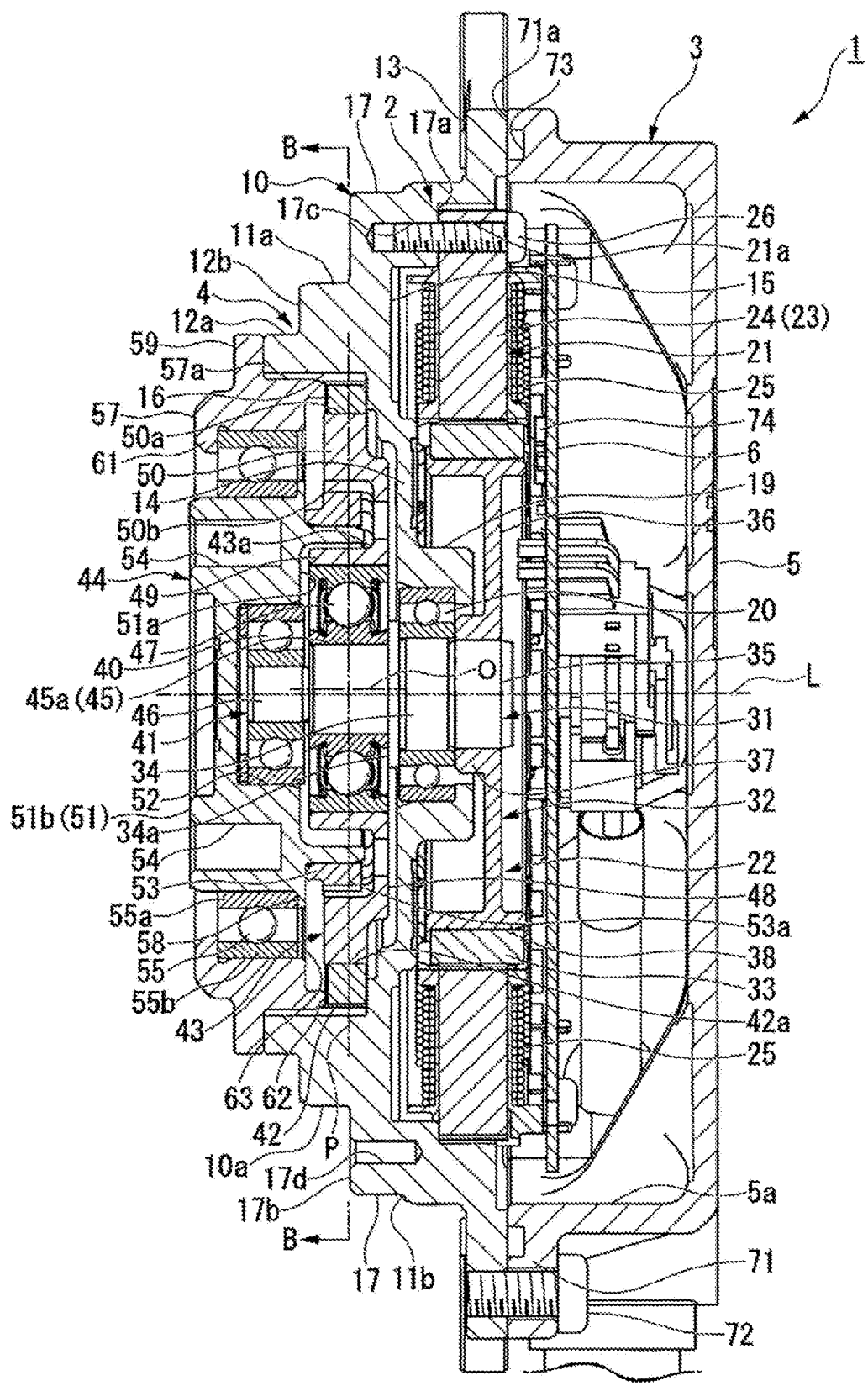
FIG. 2 is a cross-sectional view taken along the line A-A in FIG. 1.

FIG. 1 is a perspective view of a motor 1 with a speed reducer according to an embodiment of the disclosure. FIG. 2 is a cross-sectional view taken along the line A-A in FIG. 1.

As shown in FIGS. 1 and 2, the motor 1 with the speed reducer includes a motor section 2 which is in a flat shape and which is configured as a what is referred to as DC brushless motor, a control section 3 which performs drive control of the motor section 2, and a speed reduction mechanism 4 which is driven by receiving a rotational force of the motor section 2. Further, the motor 1 with the speed reducer is disposed in the order of the control section 3, the motor section 2, and the speed reduction mechanism 4 being side by side.

In addition, a motor axis (a rotation axis) L of the motor section 2 coincides with a rotation center (axis) of an output section 44 (to be described later) of the speed reduction mechanism 4. In the following description, a direction along the motor axis L may be simply referred to as an axial direction; a direction around the motor axis L may be simply referred to as a circumferential direction; and a direction orthogonal to the motor axis L and the circumferential direction may be referred to as a radial direction.

Motor Section

Casing

The motor section 2 is accommodated in a casing 10 which is in a substantially stepped circular cylindrical shape. An outer peripheral surface 10a of the casing 10 has two reduced diameter sections 11a and 12a (the first reduced diameter section 11a and the second reduced diameter section 12a) whose diameters gradually reduce via two step surfaces 11b and 12b (the first step surface 11b and the second step surface 12b) as the distance from the control section 3 increases. That is, on the outer peripheral surface 10a of the casing 10, the first reduced diameter section 11a is formed to have a reduced diameter smaller than the outer peripheral surface 10a by the first step surface 11b which is formed closer to the side of the control section 3 (the right side in FIG. 2) than the substantial center in the axial direction. Further, on the casing 10, the second reduced diameter section 12a is formed to have a reduced diameter smaller than the first reduced diameter section 11a by the second step surface 12b.

A plurality of (for example, six in the present embodiment) bolt seats 17 which protrude toward the radial-direction outer side and disposed on the first step surface 11b are integrally formed with the first reduced diameter section 11a. The bolt seats 17 are disposed at equal intervals in the circumferential direction. In these bolt seats 17, for example, three bolt seats 17 are engraved with stator inner threads 17c on a surface (back surface) 17a on the side of the control section 3. These stator inner threads 17c are disposed at equal intervals in the circumferential direction. The stator inner threads 17c are used to fasten and fix a stator 21 (to be described later) to the casing 10. In addition, the three bolt seats 17 (for example) not engraved with the stator inner threads 17c are engraved with external device inner threads 17d on another surface (front surface) 17b opposite to the surface 17a. The external device inner threads 17d are used to fasten and fix external devices (not shown).

Further, an outer flange section 13 which protrudes toward the radial-direction outer side is integrally formed on the outer peripheral surface 10a of the casing 10 at the end on the side of the control section 3. The outer flange section 13 is for fastening and fixing the casing 10 and a control case 5 (to be described later) of the control section 3.

Further, on the inner peripheral surface of the casing 10, a partition wall section 14 which protrudes toward the radial-direction inner side is integrally formed near the first step surface 11b. Then, the casing 10 is configured as a motor accommodation section 15 on the side of the control section 3 and is configured as a gear accommodation section 16 on the opposite side to the motor accommodation section 15 across the partition wall section 14, which is in a substantially circular plate shape extending in the radial direction. Further, a bearing housing 19 which is in a substantially circular cylindrical shape is integrally formed at the radial-direction center of the partition wall section 14. The bearing housing 19 is provided with a ball bearing 20 for rotatably supporting a rotor 22 (to be described later) of the motor section 2.

The motor section 2 is accommodated in the motor accommodation section 15. The motor section 2 is configured by the stator 21 which is in a substantially ring shape and the rotor 22 which is rotatably provided on the radial-direction inner side of the stator 21.

The stator 21 has a stator core 23 which is formed by laminating a plurality of electromagnetic steel sheets or by pressing soft magnetic powder. A bolt insertion hole 21a (see FIG. 2) is formed on the outer peripheral section of the stator core 23 at a position corresponding to the stator inner thread 17c of the casing 10. A bolt 26 is inserted into the bolt insertion hole 21a from the side of the control section 3 (the right side in FIG. 2), and the bolt 26 is screwed into the stator inner thread 17c of the casing 10, whereby the stator 21 is fastened and fixed to the motor accommodation section 15 of the casing 10.

Further, a plurality of teeth 24 which protrude toward the radial-direction inner side are formed on the inner peripheral surface of the stator core 23 and are disposed side by side in the circumferential direction. A coil 25 is wound around the teeth 24. When power is supplied to the coil 25, a predetermined magnetic field is generated in the stator 21.

The rotor 22 includes a rotation shaft 31 rotatably supported by the partition wall section 14 via the ball bearing 20, a rotor core 32 outerly fitted and fixed to the rotation shaft 31, and a ring magnet 33 fixed to the rotor core 32. The axis of the rotation shaft 31 is the motor axis L.

The rotation shaft 31 is configured by a support shaft 34 supported by the ball bearing 20, a mounting shaft 35 whose diameter is slightly smaller than that of the support shaft 34 and extends along the axial direction from an end of the support shaft 34 on the side of the control section 3 (the right end in FIG. 2), and a flange section 34a integrally formed at an end of the support shaft 34 opposite to the mounting shaft 35.

The outer diameter of the flange section 34a is set larger than the inner diameter of the ball bearing 20. In this way, the displacement of the rotation shaft 31 in the axial direction is regulated.

The rotor core 32 is outerly fitted and fixed to the mounting shaft 35. The rotor core 32 has a core body 36 which is in a substantially circular plate shape extending in the radial direction. At the radial-direction central section of the core body 36, an inner peripheral wall 37 which is in a substantially circular cylindrical shape is formed to protrude toward the side of the ball bearing 20 in the axial direction. The inner peripheral wall 37 is outerly fitted and fixed to the support shaft 34.

Further, an outer peripheral wall 38 which is in a substantially circular cylindrical shape is integrally formed on the outer peripheral section of the core body 36 along the axial direction. The axial-direction height of the outer peripheral wall 38 is set to be slightly larger than the axial-direction thickness of the stator core 23. The entire radial-direction inner-side end surface of the teeth 24 of the stator core 23 faces the outer peripheral wall 38 of the rotor core 32 in the radial direction. The ring magnet 33 is outerly fitted and fixed to the outer peripheral surface of the outer peripheral wall 38. The ring magnet 33 is formed in a substantially circular cylindrical shape so as to correspond to the outer peripheral wall 38. A plurality of N poles and S poles are alternately magnetized in the circumferential direction on the ring magnet 33.

In addition, the magnet fixed to the outer peripheral wall 38 is not limited to the ring magnet 33 and may be a magnet segmented in the circumferential direction. In this case, the magnet is fixed to the outer peripheral wall 38 so that the magnetic poles are disposed in order in the circumferential direction.

Speed Reduction Mechanism

Further, an eccentric shaft 41 is integrally formed at an end (left end) of the rotation shaft 31 on the side of the speed reduction mechanism 4 along the axial direction. The eccentric shaft 41 forms a part of the speed reduction mechanism 4. The speed reduction mechanism 4 is configured as a what is referred to as hypocycloid speed reduction mechanism. In addition to the eccentric shaft 41, the speed reduction mechanism 4 includes a ring gear 42 fixed to the gear accommodation section 16 of the casing 10, a rocking gear 43 meshed with the ring gear 42, and an output section 44 meshed with the rocking gear 43.

The eccentric shaft 41 is configured by an eccentric section 45 formed on the flange section 34a of the rotation shaft 31 and a support shaft 46 extending along the axial direction from an end of the eccentric section 45 opposite to the flange section 34a. The eccentric section 45 is formed in a substantially circular columnar shape. In addition, an outer peripheral surface 45a of the eccentric section 45 is formed as a circular cylindrical surface having a center O at a position eccentric with respect to the motor axis L. Further, the support shaft 46 is formed so that its shaft center coincides with the motor axis L.

The rocking gear 43 is rotatably supported by the eccentric section 45 via one ball bearing 47. The rocking gear 43 is integrally formed by a rocking gear body 48 which is in a substantially circular plate shape extending in the radial direction, a bearing housing 49 which is in a substantially circular cylindrical shape protruding from the radial-direction center of the rocking gear body 48 along the axial direction toward the opposite side to the motor section 2, and a tooth wall 50 which is in a substantially circular cylindrical shape standing upright from the outer peripheral section of the rocking gear body 48 toward the same direction as the upright direction of the bearing housing 49. Since the rocking gear 43 is formed in this way, a concave section 43a, which is in a substantially circular ring shape when viewed from the axial direction where the opposite side to the motor section 2 (the left side in FIG. 2) is opened, is formed between the bearing housing 49 and the tooth wall 50.

The bearing housing 49 of the rocking gear 43 is rotatably supported by the eccentric section 45 via the ball bearing 47. Further, the tooth wall 50 has outer teeth 50a formed on the outer peripheral surface and inner teeth 50b formed on the inner peripheral surface. Here, the axial-direction center of the outer teeth 50a, the axial-direction center of the inner teeth 50b, and the axial-direction center of the ball bearing 47 are located on the same plane P in the radial direction.

The inner teeth 42a of the ring gear 42 mesh with the outer teeth 50a of the rocking gear 43. The outer peripheral surface of the ring gear 42 is innerly fitted and fixed to the gear accommodation section 16 of the casing 10. Further, the inner teeth 42a concentric with the motor axis L are formed on the inner peripheral surface of the ring gear 42.

Outer teeth 53a of the output section 44 mesh with the inner teeth 50b of the rocking gear 43. The output section 44 has an output section body 51 in a substantially circular plate shape extending in the radial direction. A bearing accommodation concave section 52 is formed at the radial-direction center on one surface 51a of the output section body 51 on the side of the motor section 2 (the right side in FIG. 2). A ball bearing 40 is accommodated in the bearing accommodation concave section 52. The support shaft 46 of the eccentric shaft 41 is rotatably supported by the output section body 51 via the ball bearing 40.

Further, an outer teeth ring 53 is formed on the one surface 51a of the output section body 51 to protrude therefrom. In addition, the outer teeth ring 53 is formed so as to correspond to the concave section 43a of the rocking gear 43. The outer teeth ring 53 faces the concave section 43a. The outer teeth 53a meshing with the inner teeth 42a of the ring gear 42 and concentric with the motor axis L are formed on the outer peripheral surface of the outer teeth ring 53.

Here, the axial-direction center of the range of meshing between the inner teeth 42a of the ring gear 42 and the outer teeth 50a of the rocking gear 43 substantially coincides with the axial-direction center of the inner teeth 42a and the outer teeth 50a. Further, the axial-direction center of the range of meshing between the inner teeth 50b of the rocking gear 43 and the outer teeth 53a of the output section 44 substantially coincides with the axial-direction center of the inner teeth 50b and the outer teeth 53a. That is, the axial-direction center of the range of meshing between the inner teeth 42a of the ring gear 42 and the outer teeth 50a of the rocking gear 43, the axial-direction center of the range of meshing between the inner teeth 50b of the rocking gear 43 and the outer teeth 53a of the output section 44, and the axial-direction center of the ball bearing 47 are located substantially on the same plane P in the radial direction.

In addition, a plurality of (for example, four in the present embodiment) inner threads 54 are engraved on another surface 51b of the output section body 51 opposite to the one surface 51a. The inner threads 54 are for fastening and fixing external devices (not shown) to the output section 44.

In addition, the output section 44 has the output section body 51 rotatably supported by a guide section 56 via a ball bearing 55. An inner ring 55a of the ball bearing 55 is outerly fitted to the outer peripheral surface of the output section body 51. Further, a bearing outer flange section 58 which protrudes from the outer peripheral surface toward the radial-direction outer side is formed integrally on an end of the output section body 51 on the side of the rocking gear 43 (the right end in FIG. 2). The end of the inner ring 55a of the ball bearing 55 on the side of the rocking gear 43 contacts the bearing outer flange section 58, whereby the movement of the ball bearing 55 toward the side of the rocking gear 43 is regulated.

The guide section 56 is configured by a guide body 57 formed in a substantially circular cylindrical shape, and a flange section 59 integrally formed to protrude from an outer peripheral surface 57a of the guide body 57 toward the radial-direction outer side.

The flange section 59 contacts an end surface of the casing 10 on the opposite side to the control section 3. Then, the flange section 59 is fastened and fixed to the casing 10 by a plurality of (for example, four in the present embodiment) bolts 60. In this way, the guide section 56 is fixed to the casing 10.

An outer ring 55b of the ball bearing 55 is innerly fitted to the inner peripheral surface of the guide body 57. Further, a bearing inner flange section 61 which protrudes from the inner peripheral surface toward the radial-direction inner side is formed integrally on an end of the guide body 57 on the opposite side to the rocking gear 43 (the left end in FIG. 2). The end of the outer ring 55b of the ball bearing 55 on the opposite side to the rocking gear 43 contacts the bearing inner flange section 61, whereby the movement of the ball bearing 55 toward the opposite side to the rocking gear 43 is regulated. Further, the ball bearing 55 is exposed to the outside through an opening on the inner peripheral edge side of the bearing inner flange section 61.

In this way, the end of the inner ring 55a of the ball bearing 55 on the side of the rocking gear 43 contacts the bearing outer flange section 58 of the output section 44, and the end of the outer ring 55b of the ball bearing 55 on the opposite side to the rocking gear 43 contacts the bearing inner flange section 61 of the guide section 56, whereby axial-direction positioning of the ball bearing 55 is performed.

Further, a rib 62 is integrally formed on an end surface of the guide body 57 on the side of the rocking gear 43 to protrude from an outer peripheral section toward the side of the rocking gear 43. The rib 62 is formed in a substantially circular ring shape in plan view in the axial direction.

Here, the outer diameter of the output section body 51 of the output section 44 and the inner diameter of the guide body 57 of the guide section 56 are set so that the ball bearing 55 provided between the bodies 51 and 57 faces the meshing position between the inner teeth 42a of the ring gear 42 and the outer teeth 50a of the rocking gear 43 and the meshing position between the inner teeth 50b of the rocking gear 43 and the outer teeth 53a of the output section 44 in the axial direction.

In addition, the description of "facing in the axial direction" does not mean completely facing in the axial direction but means that the meshing position between the inner teeth 42a of the ring gear 42 and the outer teeth 50a of the rocking gear 43, the meshing position between the inner teeth 50b of the rocking gear 43 and the outer teeth 53a of the output section 44, and the ball bearing 55 are disposed side by side along the axial direction.

Further, since the rib 62 is provided on the guide body 57 of the guide section 56, a gap is formed on the radial-direction inner side of the rib 62. That is, a gap is formed between the meshing position between the inner teeth 42a of the ring gear 42 and the outer teeth 50a of the rocking gear 43, the meshing position between the inner teeth 50b of the rocking gear 43 and the outer teeth 53a of the output section 44, and the ball bearing 55. The gap is configured as a lubricant reservoir 63. The lubricant reservoir 63 is filled with a lubricant (not shown). The lubricant helps reducing the meshing resistance between the inner teeth 42a of the ring gear 42 and the outer teeth 50a of the rocking gear 43 and the meshing resistance between the inner teeth 50b of the rocking gear 43 and the outer teeth 53a of the output section 44, and helps reducing the sliding resistance of the ball bearing 55.

The ball bearing 55 is exposed to the outside through an opening on the inner peripheral edge side of the bearing inner flange section 61 of the guide section 56. Therefore, it is desirable to provide a seal on at least a surface of the ball bearing 55 on the side of the bearing inner flange section 61. This can prevent dust and the like from entering the ball bearing 55 from the outside.

Control Section

The control section 3 includes the control case 5 which is in a circular cylindrical shape with a bottom and a control board 6 accommodated in the control case 5. The control case 5 is disposed with an opening 5a facing the side of the motor section 2. In addition, an outer flange section 71 protruding toward the radial-direction outer side is formed in the opening 5a of the control case 5. An end surface 71a of the outer flange section 71 on side of the motor section 2 contacts the outer flange section 13 of the casing 10. Then, the outer flange section 71 of the control case 5 and the outer flange section 13 of the casing 10 are fastened and fixed by a plurality of bolts 72 (see FIG. 1).

Further, an O-ring groove 73 is formed over the entire periphery on the end surface 71a of the outer flange section 71 of the control case 5. By mounting an O ring (not shown) in the O-ring groove 73, the sealing property between the outer flange section 71 of the control case 5 and the outer flange section 13 of the casing 10 is ensured.

Further, in the control case 5, a power outlet 77, which is in a substantially circular cylindrical shape for drawing out a power harness 75 (to be described later) connected to the control board 6 accommodated in the control case 5, and a sensor outlet 78, which is in a substantially circular cylindrical shape for drawing out a sensor harness 76, are formed to protrude outward.

The control board 6 is formed by what is referred to as a plurality of conductive patterns (not shown) on an epoxy board. The control board 6 is disposed so that one surface thereof faces the stator 21 and the rotor 22 in the axial direction. Further, a plurality of magnetic detection elements 74 are mounted on the control board 6 at positions facing the ring magnet 33 of the rotor 22 in the axial direction. The magnetic detection elements 74 detect the rotation position of the rotor 22 by detecting a magnetic change of the ring magnet 33.

Further, the control board 6 is connected to a terminal section of the coil 25 of the stator 21, to a terminal section of the power harness 75 connected to an external power supply (not shown) and to a terminal section of the sensor harness 76 connected to an external control device (not shown). A capacitor (not shown) and the like for smoothing a voltage applied to the control board 6 are mounted on the control board 6. Further, for example, a power module (not shown) including a switching element such as a field effect transistor (FET) for controlling a current supplied to the coil 25 may be mounted on the control board 6.

Operation of Motor with Speed Reducer

Next, the operation of the motor 1 with the speed reducer will be described.

When a predetermined current is supplied to the coil 25 of the motor section 2 via the control section 3, a predetermined magnetic field is generated in the stator 21. Then, a magnetic attractive force and a magnetic repulsive force are generated between the magnetic field and the ring magnet 33 of the rotor 22, and the rotor 22 rotates.

When the rotor 22 rotates, the eccentric shaft 41 integrally formed with the rotation shaft 31 of the rotor 22 rotates. When the eccentric shaft 41 rotates, the rocking gear 43 is rotated by the rotation of the eccentric shaft 41. Here, the rocking gear 43 is rotatably provided with respect to the eccentric section 45 of the eccentric shaft 41 via the ball bearing 47, and the outer teeth 50a of the rocking gear 43 are meshed with the inner teeth 42a of the ring gear 42.

Therefore, the rocking gear 43 revolves around the motor axis L, and it rotates at a reduced speed with respect to the eccentric shaft 41 around the center O (see FIG. 2) of the eccentric section 45. In addition, due to the rocking rotation of the rocking gear 43, a dynamic force is transmitted from the rocking gear 43 to the output section 44 meshed with the inner teeth 50b of the rocking gear 43. In this way, the output section 44 rotates.

Here, meshing points PA and PB of the respective teeth 42a, 50a, 50b and 53a will be described with reference to FIG. 3.

Figure 3:
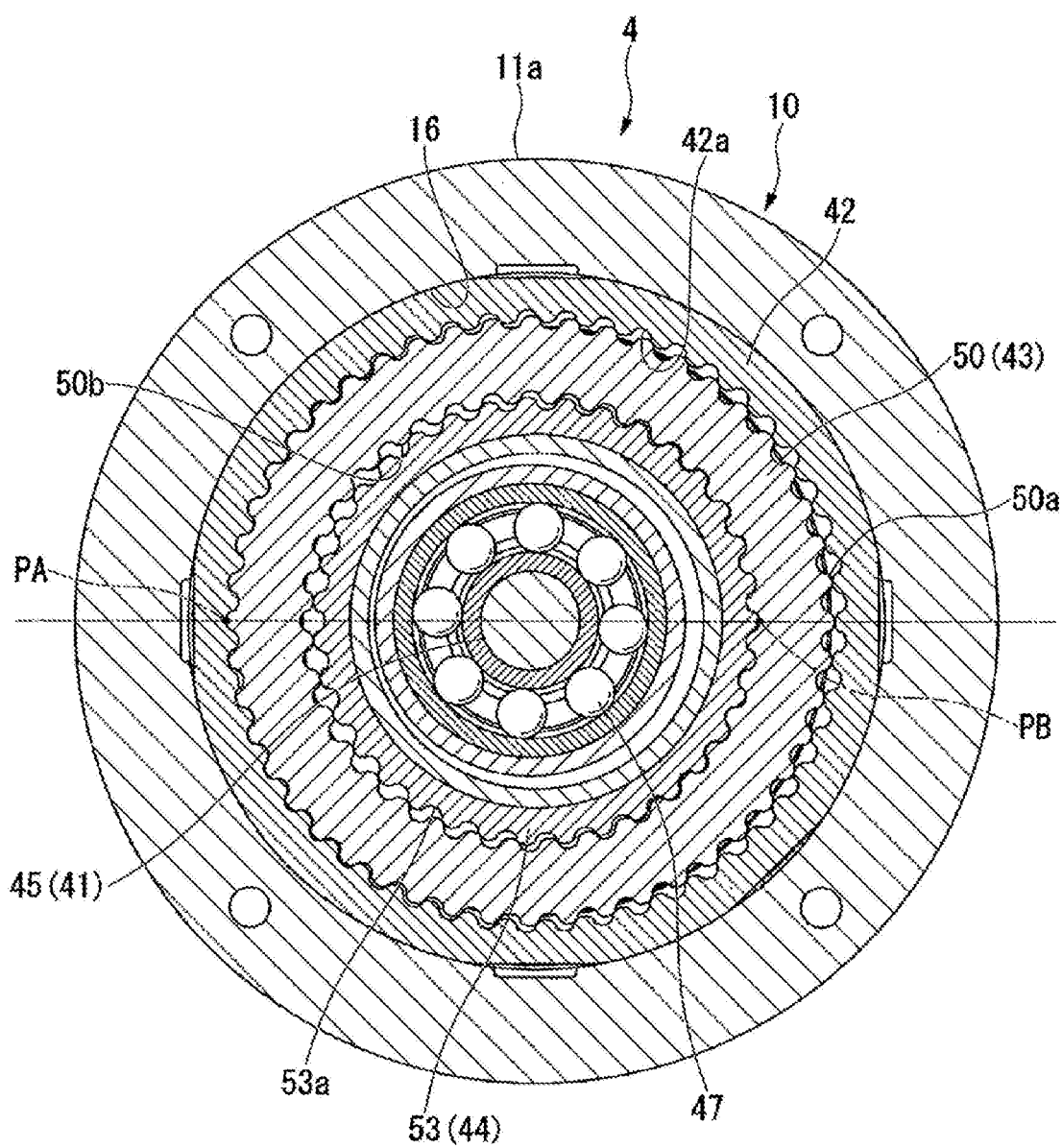
FIG. 3 is a cross-sectional view taken along the line B-B in FIG. 2.

FIG. 3 is a cross-sectional view taken along the line B-B in FIG. 2.

As shown in FIG. 3, the meshing point PA between the inner teeth 42a of the ring gear 42 and the outer teeth 50a of the rocking gear 43 and the meshing point PB between the inner teeth 50b of the rocking gear 43 and the outer teeth 53a of the output section 44 are located on two sides across the motor axis L.

As described above, in the above embodiment, the axial-direction center of the range of meshing between the inner teeth 42a of the ring gear 42 and the outer teeth 50a of the rocking gear 43, the axial-direction center of the range of meshing between the inner teeth 50b of the rocking gear 43 and the outer teeth 53a of the output section 44, and the axial-direction center of the ball bearing 47 are located substantially on the same plane P in the radial direction. Therefore, the direction of the load applied to the ball bearing 47 by the meshing reaction force (meshing load) between the inner teeth 42a of the ring gear 42 and the outer teeth 50a of the rocking gear 43 becomes a direction substantially along the radial direction. Further, the direction of the load applied to the ball bearing 47 by the meshing reaction force between the inner teeth 50b of the rocking gear 43 and the outer teeth 53a of the output section 44 also becomes a direction substantially along the radial direction. In addition, since both of the meshing reaction forces are substantially along the radial direction, it is possible to suppress the falling load from being applied to the rocking gear 43.

Therefore, the speed reduction efficiency of the speed reduction mechanism 4 can be increased. Further, for a countermeasure against the falling load of the rocking gear 43, for example, it is not necessary to rotatably support the rocking gear 43 on the eccentric section 45 of the eccentric shaft 41 by using two ball bearings, and one ball bearing 47 can receive the meshing reaction force of the respective teeth 42a, 50a, 50b and 53a. In addition, the reduction in the number of bearings as compared with conventional ones can reduce the axial-direction thickness of the speed reduction mechanism 4. As a result, the speed reduction mechanism 4 can be more compact.

Further, the rocking gear 43 is configured by the rocking gear body 48 which is in a substantially circular plate shape extending in the radial direction, the bearing housing 49 which is in a substantially circular cylindrical shape protruding from the radial-direction center of the rocking gear body 48 along the axial direction toward the opposite side to the motor section 2, and the tooth wall 50 which is in a substantially circular cylindrical shape standing upright from the outer peripheral section of the rocking gear body 48 toward the same direction as the upright direction of the bearing housing 49. Moreover, by forming the outer teeth 50a and the inner teeth 50b on the tooth wall 50, it is configured that the axial-direction center of the range of meshing between the inner teeth 42a of the ring gear 42 and the outer teeth 50a of the rocking gear 43, and the axial-direction center of the range of meshing between the inner teeth 50*b* of the rocking gear 43 and the outer teeth 53*a* of the output section 44 are located substantially on the same plane P in the radial direction. In this way, the axial-direction center of the meshing range of the respective teeth 42*a,* 50*a,* 50*b* and 53*a* can be made to be located substantially on the same plane P in the radial direction while the rocking gear 43 has a simple structure. As a result, it is possible to more effectively making the speed reduction mechanism 4 compact while suppressing the manufacturing cost of the speed reduction mechanism 4.

Further, the outer diameter of the output section body 51 of the output section 44 and the inner diameter of the guide body 57 of the guide section 56 are set so that the ball bearing 55 provided between the bodies 51 and 57 faces the meshing position between the inner teeth 42*a* of the ring gear 42 and the outer teeth 50*a* of the rocking gear 43 and the meshing position between the inner teeth 50*b* of the rocking gear 43 and the outer teeth 53*a* of the output section 44 in the axial direction. That is, the meshing position between the inner teeth 42*a* of the ring gear 42 and the outer teeth 50*a* of the rocking gear 43, the meshing position between the inner teeth 50*b* of the rocking gear 43 and the outer teeth 53*a* of the output section 44, and the ball bearing 55 are disposed side by side along the axial direction. In addition, the rib 62 is provided on the guide body 57 of the guide section 56, whereby a gap is formed between the meshing position between the inner teeth 42*a* of the ring gear 42 and the outer teeth 50*a* of the rocking gear 43, the meshing position between the inner teeth 50*b* of the rocking gear 43 and the outer teeth 53*a* of the output section 44, and the ball bearing 55. The gap is configured as the lubricant reservoir 63.

Therefore, by filling the lubricant reservoir 63 with the lubricant, the lubricant can be applied to the meshing positions of the respective teeth 42*a,* 50*a,* 50*b* and 53*a,* and the meshing resistance of the respective teeth 42*a,* 50*a,* 50*b* and 53*a* can be reduced. At the same time, since the lubricant in the lubricant reservoir 63 can also be applied to the ball bearing 55, the sliding resistance of the ball bearing 55 can also be reduced.

As a result, a reduction in the speed reduction efficiency of the speed reduction mechanism 4 can be suppressed, and the efficiency of the speed reduction mechanism 4 can be increased. In addition, since the sliding resistance of the ball bearing 55 can be reduced, the size of the ball bearing 55 can be suppressed from being increased, and the speed reduction mechanism 4 can be compact.

Further, since the lubricant is filled on the side of the lubricant reservoir 63 of the ball bearing 55, even if a seal is not provided on the side of the lubricant reservoir 63, it is possible to prevent dust from entering the ball bearing 55 by the lubricant. Therefore, the cost of the ball bearing 55 can be reduced.

In addition, the end of the inner ring 55*a* of the ball bearing 55 on the side of the rocking gear 43 contacts the bearing outer flange section 58 of the output section 44, and the end of the outer ring 55*b* of the ball bearing 55 on the opposite side to the rocking gear 43 contacts the bearing inner flange section 61 of the guide section 56, whereby axial-direction positioning of the ball bearing 55 is performed. By adopting such a configuration, the relative positions of the guide section 56, the ball bearing 55, and the output section 44 can be determined with high accuracy. Therefore, the size of the lubricant reservoir 63 can be easily set according to the application, and the amount of the lubricant filled in the lubricant reservoir 63 can be adjusted. In this way, the life of the speed reduction mechanism 4 and the ball bearing 55 can be extended.

In addition, the disclosure is not limited to the above embodiment and includes various modifications of the above embodiment without departing from the spirit of the disclosure.

For example, in the above embodiment, a case has been described in which the ball bearings 20, 40 and 47 are adopted as the bearings used in the motor 1 with the speed reducer. However, the disclosure is not limited thereto, and various bearings can be adopted. However, it is desirable to use a rolling bearing rather than a sliding bearing. For example, roller bearings can be used instead of the ball bearings 20, 40 and 47.

In addition, in the above embodiment, it is sufficient that at least part of the range of meshing between the inner teeth 42*a* of the ring gear 42 and the outer teeth 50*a* of the rocking gear 43 and at least part of the range of meshing between the inner teeth 50*b* of the rocking gear 43 and the outer teeth 53*a* of the output section 44 overlap each other in the radial direction.

That is, as shown in detail in FIG. 3, the meshing point PA between the inner teeth 42*a* of the ring gear 42 and the outer teeth 50*a* of the rocking gear 43 and the meshing point PB between the inner teeth 50*b* of the rocking gear 43 and the outer teeth 53*a* of the output section 44 are located on two sides across the motor axis L. Therefore, when at least part of the range of meshing between the inner teeth 42*a* of the ring gear 42 and the outer teeth 50*a* of the rocking gear 43 and at least part of the range of meshing between the inner teeth 50*b* of the rocking gear 43 and the outer teeth 53*a* of the output section 44 overlap each other in the radial direction, the meshing reaction forces of the respective teeth 42*a,* 50*a,* 50*b* and 53*a* offset each other, and it is possible to suppress the falling load from being applied to the rocking gear 43 as much as possible. As a result, the speed reduction efficiency of the speed reduction mechanism 4 can be increased, and one ball bearing 47 can receive the meshing reaction forces of the respective teeth 42*a,* 50*a,* 50*b* and 53*a*.

Further, in the above embodiment, a case has been described in which the rocking gear 43 is configured by the rocking gear body 48 which is in a substantially circular plate shape, the bearing housing 49 which is in a substantially circular cylindrical shape, and the tooth wall 50 which is in a substantially circular cylindrical shape. However, the disclosure is not limited thereto. It is sufficient that the rocking gear 43 is configured so that at least part of the range of meshing between the inner teeth 42*a* of the ring gear 42 and the outer teeth 50*a* of the rocking gear 43 and at least part of the range of meshing between the inner teeth 50*b* of the rocking gear 43 and the outer teeth 53*a* of the output section 44 overlap each other in the radial direction.

In addition, in the above embodiment, a case has been described in which the rib 62 is provided on the guide body 57 of the guide section 56, whereby a gap is formed between the meshing position between the inner teeth 42*a* of the ring gear 42 and the outer teeth 50*a* of the rocking gear 43, the meshing position between the inner teeth 50*b* of the rocking gear 43 and the outer teeth 53*a* of the output section 44, and the ball bearing 55, and the gap is configured as the lubricant reservoir 63. However, it is sufficient that the lubricant reservoir 63 is formed between the meshing position between the inner teeth 42*a* of the ring gear 42 and the outer teeth 50*a* of the rocking gear 43, the meshing position between the inner teeth 50*b* of the rocking gear 43 and the outer teeth 53*a* of the output section 44, and the ball bearing 55. For example, the lubricant reservoir 63 may be formed by changing the shape of the casing 10 or disposing a separate ring member instead of the rib 62.

What is claimed is:

1. A speed reduction mechanism comprising:
   an eccentric shaft rotated around a rotation axis by a rotational force of a motor section and having an eccentric outer peripheral surface with a center at an eccentric position eccentric to the rotation axis;
   a rocking gear rotatably supported by the eccentric outer peripheral surface via a first bearing and having first inner teeth and first outer teeth;
   a fixed gear having second inner teeth which mesh with the first outer teeth of the rocking gear and which are concentric with the rotation axis; and
   an output gear having second outer teeth which mesh with the first inner teeth of the rocking gear and which are concentric with the rotation axis,
   wherein at least part of a range of meshing between the first outer teeth of the rocking gear and the second inner teeth of the fixed gear and at least part of a range of meshing between the first inner teeth of the rocking gear and the second outer teeth of the output gear overlap each other in a radial direction orthogonal to the rotation axis,
   wherein a center position in a direction of the rotation axis of the range of meshing between the first outer teeth of the rocking gear and the second inner teeth of the fixed gear, a center position in the direction of the rotation axis of the range of meshing between the first inner teeth of the rocking gear and the second outer teeth of the output gear, and a center position in the direction of the rotation axis of the first bearing are located on a same plane in the radial direction.

2. The speed reduction mechanism according to claim 1, wherein the rocking gear comprises:
   a rocking gear body which is in a circular plate shape extending in the radial direction;
   a bearing housing which is in a cylindrical shape standing upright from a radial-direction center of the rocking gear body and fitted to the first bearing; and
   a tooth wall which is in a cylindrical shape standing upright from an outer peripheral section of the rocking gear body toward a same direction as an upright direction of the bearing housing,
   wherein the first inner teeth are formed on an inner peripheral surface of the tooth wall, and
   the first outer teeth are formed on an outer peripheral surface of the tooth wall.

3. The speed reduction mechanism according to claim 1, further comprising:
   a gear housing which rotatably supports the eccentric shaft and in which the rocking gear and the fixed gear are accommodated; and
   a cover which is fixed to the gear housing and which rotatably supports the output gear via a second bearing,
   wherein a first meshing position between the first outer teeth of the rocking gear and the second inner teeth of the fixed gear, a second meshing position between the first inner teeth of the rocking gear and the second outer teeth of the output gear, and the second bearing are disposed side by side in a direction of the rotation axis, and
   a lubricant reservoir is provided between the first meshing position, the second meshing position, and the second bearing.

4. The speed reduction mechanism according to claim 3, wherein
   the second bearing is a rolling bearing having an inner ring and an outer ring,
   the inner ring of the second bearing is fitted to the output gear so that one end of the inner ring contacts the output gear, and
   the outer ring of the second bearing is fitted to the cover so that another end of the outer ring on an opposite side to the one end of the inner ring contacts the cover.

5. A motor with a speed reducer, comprising:
   the speed reduction mechanism according to claim 1; and
   the motor section having a rotation shaft connected to the eccentric shaft and rotating around the rotation axis.

* * * * *